Sept. 4, 1962 T. H. MURPHY 3,051,981
LUBRICATION STRUCTURE FOR A SWIVEL CASTER
Filed Aug. 25, 1958 2 Sheets-Sheet 1
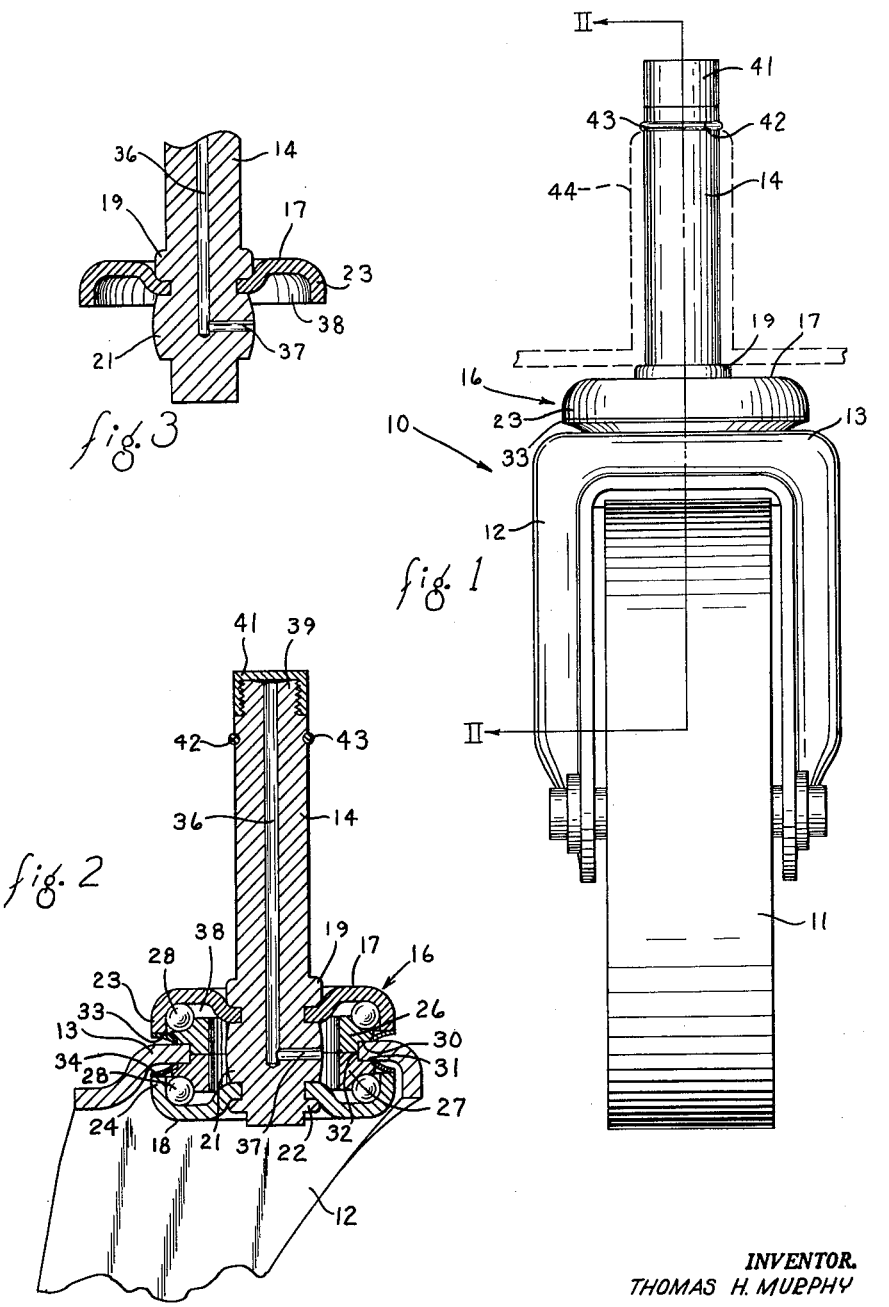
INVENTOR.
THOMAS H. MURPHY
BY
Woodhams, Blanchard and Flynn
ATTORNEYS Sept. 4, 1962  T. H. MURPHY  3,051,981
LUBRICATION STRUCTURE FOR A SWIVEL CASTER
Filed Aug. 25, 1958  2 Sheets-Sheet 2

INVENTOR.
THOMAS H. MURPHY
BY
Woodhams Blanchard & Flynn
ATTORNEYS

United States Patent Office
3,051,981
Patented Sept. 4, 1962

3,051,981
LUBRICATION STRUCTURE FOR A SWIVEL CASTER
Thomas H. Murphy, Kalamazoo, Mich., assignor to Pemco Wheel Company, Kalamazoo, Mich., a corporation of Michigan
Filed Aug. 25, 1958, Ser. No. 756,837
1 Claim. (Cl. 16—36)

This invention relates in general to a swivel caster and, more particularly, to a type thereof having a swivel bearing assembly defining a closed chamber and lubrication structure for directing lubricant into said chamber. This application is a continuation-in-part of my application Serial No. 702,926, filed December 16, 1957, now Patent No. 2,998,617.

While the structure comprising the invention is applicable in a wide variety of circumstances, the particular need giving immediate rise to the invention has developed in the use of swivel casters for shopping carriers and, accordingly, the description of the invention will proceed in terms of such use. However, it will be recognized that this will be only illustrative and not limiting.

In the use of swivel casters for shopping carriers, it has long been recognized that the lubrication problem was treated inadequately. For example, in many cases the casters have in the past been supplied with lubricant at the factory but with no provision made for introducing further lubricant into the swivel assembly. Hence the swivel mechanism of the shopping carrier would eventually become stiff and the carrier would fail to operate as smoothly as is desirable in a high grade store to maintain good customer relations. Some attempts have been made to solve this problem by placing an opening in the underside of the bearing enclosure for the introduction of further grease thereinto (the upperside being normally inaccessible). This has been reasonably satisfactory from the standpoint of permitting replacement or renewal of the lubricant within the bearing enclosure of a given shopping carrier, but it has required the inverting of the given shopping carrier in order to apply the lubricant thereto. While the inverting of any one shopping carrier is a minor task, where there are involved large numbers of shopping carriers, as in the usual super market, the inconvenience of inverting each carrier for the application of lubricant to the swivel bearing thereof has been such that the work was either done very inefficiently, sometimes only spasmodically, and often not at all.

A further problem has arisen from the underneath location of previous access means provided for introducing lubricant into the bearing enclosure of the swivel portion of the swivel caster. Such location of the access opening, entirely aside from the necessity of inverting the shopping carrier in order to reach it, has been undesirable due to the occasional tendency of lubricant to drop out of the access opening onto the floor or due to the tendency of dust and dirt to gather in such access opening. This latter is particularly prevalent where the caster is being used on a shopping carrier which is in turn being used on a relatively dusty floor, particularly where such dust is being continuously agitated as in the usual super market.

On the other hand, shopping carriers of all types, and including the swivel casters forming a part thereof, are an extremely competitive item and it has accordingly been impossible from the standpoint of expense to provide conventional lubricating devices on the swivel mechanism of the caster.

Accordingly, it has for a long time been desirable to provide a swivel caster with means for introducing lubrication into the swivel bearing mechanism, which means are readily accessible without inverting or otherwise changing the position of the shopping carrier from its normal position of use, and without involving appreciable additional expense.

The foregoing reference to the use of such casters on shopping carriers will sufficiently illustrate the maintenance problem involved in the present form of caster construction. Other uses of such casters will be readily recognized by those skilled in the art, such as use with surgical operating tables with respect to which it is highly desirable to improve the ease of lubricating the swivel portion of the caster as well as to eliminate the access opening from the underside of the bearing enclosure.

In certain types of heavy duty casters employing ball bearing swivel structure, and particularly those having a mounting plate which is secured to the bottom of the equipment being supported, acess to the bearing assembly through the upper side of the caster, including the king pin, becomes virtually impossible. In fact, it becomes extremely difficult to reach the swivel structure for lubrication purposes except through the lowest portion thereof. However, my invention can be applied, at least in part, to these plate-type casters and when so applied it overcomes or avoids many of the lubrication problems which have previously existed. For example, even though the lubrication opening is on the lower side of the swivel structure, leakage can be prevented or at least made inconsequential by means of my invention.

Thus, a primary object of this invention is to overcome a long standing and demonstrated need for a lubrication structure in the swivel bearing assembly of a swivel caster, whereby the swivel bearing can be lubricated without tipping or inverting the equipment with which the swivel caster is being used.

A further object of this invention is the provision of a lubrication structure, as aforesaid, including a passageway which extends downwardly through the swivel post of the swivel caster and is, therefore, readily accessible preferably near the upper end of the caster.

A further object of this invention is the provision of a lubrication structure, as aforesaid, which is extremely simple in form and use, and which can be adapted to existing swivel bearing constructions.

A further object of this invention is the provision of a lubrication structure for a swivel bearing assembly, as aforesaid, which can, if desired, be easily arranged to positively prevent the introduction of dust or dirt particles into the bearing enclosure.

Other objects and purposes of this invention will become apparent to persons familiar with this type of equipment upon reading the following specification and examining the accompanying drawings in which:

FIGURE 1 is a front elevational view of a swivel caster embodying the invention.

FIGURE 2 is a sectional view taken along the line II—II of FIGURE 1.

FIGURE 3 is a fragment of FIGURE 2 showing the swivel structure in a partially assembled condition.

Figure 4:
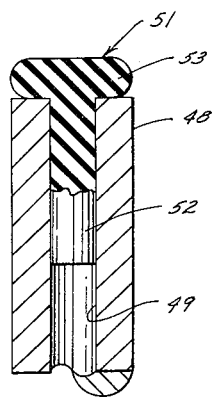
FIGURE 4 is a central cross sectional view of a modified closure construction for the lubrication opening in the swivel post or spindle.

For the purpose of convenience in description, the terms "upper," "lower," and derivatives thereof will have reference to a swivel caster embodying the invention when appearing in its normal position of use, as shown in FIGURES 1 and 2. The terms "inner," "outer" and derivatives thereof will have reference to the geometric center of the swivel bearing structure in said caster and parts associated therewith.

General Description

In order to meet the objects of this invention, including those set forth above, there has been provided a swivel caster construction comprising a wheel supporting yoke, a swivel post or spindle, and an enclosed swivel bearing assembly mounted upon said post and supporting said yoke rotatably with respect to the swivel post. The swivel post is provided with a lengthwise passageway which communicates through the side wall of said post with the interior of the enclosure housing the swivel bearing.

Detailed Construction

The swivel caster 10 (FIGURE 1) is a typical structure with which the invention may be utilized and it has accordingly been selected to illustrate the invention. However, the invention is applicable to many other swivel caster structures of both sealed and unsealed type and the selection of one particular bearing structure to illustrate the invention is not to be taken as limiting.

The particular bearing structure chosen to illustrate the invention may be as disclosed in the copending patent application Serial No. 678,287, filed August 15, 1957, and assigned to the assignee of this application. Briefly, such swivel caster 10 is comprised of a caster wheel 11 rotatably supported upon and within a wheel yoke 12 having a mounting plate 13 at its upper end. The yoke 12 is rotatably supported upon the swivel post or spindle 14 by means of the swivel bearing assembly 16, which is secured to the lower end of said post 14 and rotatably supports the mounting plate 13.

In more detail, the swivel assembly 16 (FIGURE 2) includes upper and lower annular bearing ball retainers 17 and 18, which are preferably substantially identical. Said ball retainers have circular, coaxial openings through which the lower end of the post 14 is slidably receivable. Said post 14 has an annular external flange 19 spaced from the lower end thereof and against which the upper ball retainer 17 is disposed. The lower portion of the post 14 is then compressed, as by means of a forging operation, against the upper retainer 17 to provide an annular enlargement 21, as shown in FIGURE 3, for snugly holding said upper ball retainer 17 against the annular flange 19. The lower ball retainer 18 is sleeved upon the lower end of the post 14 against the annular enlargement 21 after certain bearing parts described hereinafter are properly placed between said ball retainers. Then, the extreme lower end of the said post 14 is upset, as by a forging or staking operation, to provide the annular ridge 22 which holds the lower ball retainer 18 snugly against the annular enlargement 21.

The ball retainers 17 and 18 have peripheral flanges 23 and 24, respectively, which extend toward each other. A pair of adjacent thrust rings 26 and 27 encircle, and are spaced radially outwardly from, the annular enlargement 21 and are spaced radially inwardly from the peripheral flanges 23 and 24, respectively. A plurality of bearing balls 28 are disposed between the respective ball retainers 17 and 18 and thrust rings 26 and 27.

The thrust rings 26 and 27 have adjacent annular notches 30 and 31, which cooperate to provide a circumferential groove in which the wall of the central opening 32 in the mounting plate 13 is snugly receivable. Annular sealing rings 33 and 34 in this embodiment extend between the peripheral flanges 23 and 24 and the thrust rings 26 and 27, respectively, to complete the sealed enclosure of the chamber 38 for the bearing balls 28, but said sealing rings may be omitted if desired.

The swivel post 14 has a lengthwise, preferably coaxial passageway 36 which extends from a point preferably disposed approximately midway between the bearing ball retainers 17 and 18 through the upper end of said post. A radial passageway 37 extends from the lower end of said axial passageway 36 through the side wall of the post 14 and communicates with the chamber 38. A grease receiving fitting, such as an Alemite fitting (not shown), may be provided at the upper end of the passageway 36, if desired.

The axial passageway 36 and radial passageway 37 are preferably provided in the swivel post 14 after the annular enlargement 21 has been formed, whereby the upper ball retainer 17 is affixed upon the swivel post 14, as shown in FIGURE 3. Accordingly, no material distortion is created in either of these passageways during and by the mounting of the lower ball retainer 18 upon the post 14.

The upper end portion 39 of the swivel post 14 may, if desired, be reduced in diameter and be externally threaded to receive an internally threaded dust cap 41 for closing the upper end of the axial passageway 36. Said swivel post 14 may also be provided with an annular recess 42 below said threaded portion 39 for reception of a snap ring 43, which prevents accidental disengagement of the swivel post 14 from within means, such as the sleeve 44 on the equipment supported by said swivel caster 10, through which the post 14 is slidably received.

Accordingly, when it becomes desirable to lubricate the bearing balls 28 and associated bearing surfaces within the lubrication chamber 38, the dust cap 41 (where used) is removed from the upper end of the swivel post 14 and a suitable lubricant, such as oil or grease under pressure, is introduced into the upper end of the axial passageway 36. Such lubricant moves through the axial passageway 36 and the radial passageway 37 into the lubrication chamber 38 where it covers said bearing balls and the bearing surfaces within said chamber. The dust cap 41, if used, is replaced upon the upper end of the swivel post 14 and the lubrication operation is completed. It will be noted that such lubrication is accomplished without changing the position of the swivel caster or the equipment associated therewith.

Alternate Construction

The alternate swivel post 48 (FIGURE 4) has a coaxial lubrication passageway 49 which opens through the upper end of said post. The closure member 51, which may be fabricated from any convenient and appropriate material, has an elongated stem 52 which is snugly and slidably receivable into the upper end of the passageway 49. Said closure member has a head 53 at the upper end of the stem 52 which preferably covers the upper end of the post 48 and which can be colored to provide a decorative effect. The stem 52 serves not only to hold the closure member 51 firmly with respect to the swivel post 48 but also to force lubricant lodged within the passageway 49 into the associated bearings assembly, such as that indicated at 16 in FIGURE 2.

Figure 5:
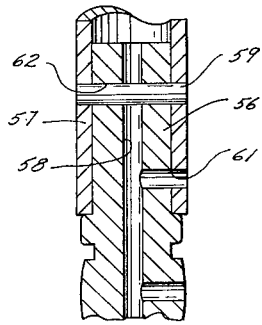
FIGURE 5 is a central cross sectional view of an alternate lubrication construction wherein the upper end of the spindle is not easily accessible.

Referring now to the form shown in FIGURE 5, there are numerous circumstances wherein the swivel post 56 is disposed within the lower end of a hollow tubular member 57, such as the leg of a table, a chair or the like. In such case, the upper end of the swivel post 56 is generally inaccessible. Furthermore, even if the upper end of the swivel post can be reached, as by providing an opening through the side wall of the tubular member just above the upper end of the post 56, the lubrication passageway 58 would often be blocked by a pin 59 which under frequently occurring circumstances extends through both the swivel post 56 and the tubular member 57 to prevent relative movement therebetween. In this case an additional transverse passageway 61 is provided through both the tubular member 57 and the swivel post 56 below the pin 59 to provide communication with said passageway 58, whereby lubrication can be effected in substantially the same manner as set forth above with respect to the construction shown in FIGURE 2. The transverse passageway 61 can be accurately prelocated by reference to the opening 62 through the post 56 and tubular member 57 in which the pin 59 is disposed. Accordingly, alignment of the two portions of the passageway 58 will be automatically achieved when the pin 59 is inserted into the opening 62 through the member 57 and post 56.

Figure 6:
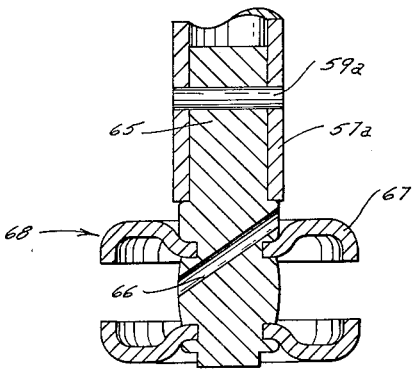
FIGURE 6 is a central cross sectional view of another alternate structure whereby lubrication can be introduced at a point below the upper end of said spindle.

The swivel post 65 (FIGURE 6) is also received into the lower end of a tubular member 57a and held therein by means, such as the pin 59a. The lubrication passageway 66 extends in this particular embodiment diagonally and downwardly through the swivel post 65 from a point located between the lower end of the tubular member 57a and the upper retaining ring 67 of the bearing assembly 68. The lower end of the passageway 66 communicates with the interior of said bearing assembly 68 between the upper and lower retaining rings thereof. This particular structure may, under some circumstances, require a larger distance between the tubular member 57a and the upper retaining ring 67 than that required for the FIGURE 5 construction, for example.

Figure 7:
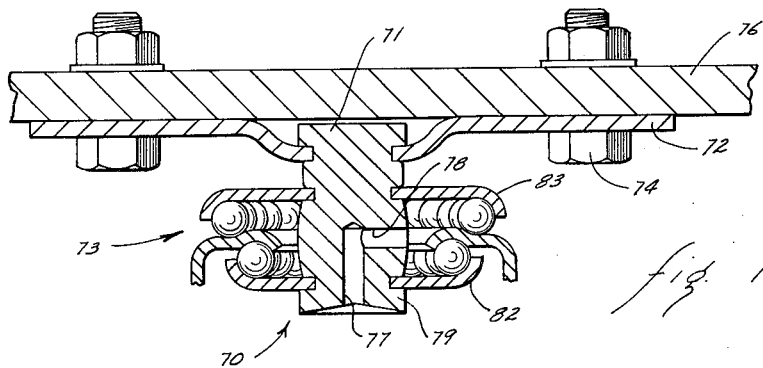
FIGURE 7 is a central cross sectional view of a lubrication structure for the swivel bearing of a plate-type caster.

In the plate-type caster 70 (FIGURE 7), the swivel post or king pin 71 is secured to and extends downwardly from a mounting plate 72 to support a swivel bearing assembly 73. The mounting plate 72 is normally secured by means, such as the bolts 74, to the lower surface of the equipment 76 which the caster 70 supports. Accordingly, the upper end of the swivel post 71 is often inaccessible. Moreover, even lubrication passageways of the type shown in FIGURE 6 would be virtually inaccessible due to the lateral extent of the mounting plate 72 and the further lateral extent as a rule of the equipment 76 engaged by said mounting plate 72. Furthermore, the lateral extent of both the mounting plate 72 and the equipment are often such that the upper portion of the bearing assemby 73 can not be reached, regardless of what approach is used according to existing procedures. However, by providing a lengthwise passageway 77 upwardly through the lower end of the swivel post 71 and a transverse passageway 78 communicating between said passageway 77 and the interior of the bearing assembly 73, lubrication of the bearing assembly 73 can be effectively accomplished. Ordinarily, the plate-type caster construction of FIGURE 7 is used primarily for heavy duty operations where a slight amount of oil leakage from the lower end of the passageway 77 would be immaterial. However, if necessary, a closure member such as that shown at 51 in FIGURE 4 may be extended upwardly into the passageway 77 to prevent such leakage. Although this form of the invention may not provide the desired convenience in effecting lubrication of the bearing assembly 73, it does make such lubrication much easier and more effective than has been customary in the past for the plate-type caster.

The passageways 77 and 78 are preferably provided in the swivel post 71 prior to the staking or swedging operation performed on the lower end of the swivel post 71 for the purpose of providing the annular flange 79 whereby the lower retaining ring 81 of the bearing assembly 73 is mounted upon said post 71. It is a well-known fact that a swedging or staking operation of this type is difficult to control because the staking tool tends to drift away from an exact coaxial position with respect to the swivel post 71 during the process of the staking operation. Accordingly, it is sometimes necessary to discard or reject a caster of this type because of the fact that the staking operation has produced a bearing assembly wherein the lower retaining ring 80 is not parallel with the upper retaining ring 81 and a condition of binding results. However, by providing the staking tool with a pilot insertable into the lower end of the passageway 77, accurate centering of the staking tool is assured throughout the entire operation, thereby resulting in an accurately fabricated swivel bearing assembly.

Although particular preferred embodiments of the invention have been disclosed in detail for illustrative purposes, it will be understood that variations or modifications of such disclosure, which lie within the scope of the appended claim, are fully contemplated.

I claim:

In a swivel caster for connection to and support of a structure having a post receiving opening therein, said caster including a wheel and a yoke therefor, the combination comprising: a post having an annular ridge near its lower end, the upper end portion of said post being received in said opening and secured to said structure, so that said upper end portion is inaccessible; a pair of spaced, bearing retainer rings secured to said post near said lower end thereof and on either side of said ridge, said retainer rings having peripheral flanges extending substantially toward each other and having a first pair of bearing surfaces on their opposing faces; annular support means engaging said yoke, coaxially aligned with said ridge and spaced radially outwardly therefrom, said annular support means supporting and defining a second pair of bearing surfaces on opposite axial sides thereof, said second surfaces respectively facing said first surfaces; a pair of sets of bearing balls disposed, respectively, between the corresponding and facing surfaces of said first and second pair of surfaces; annular sealing means between said annular support means and at least one of said retainer rings, the sealing means, the retainer rings, the annular support means and the adjacent portion of said post forming an annular, substantially closed bearing compartment; a passageway extending through a portion of said post near the lower end thereof, said passageway having an upper end opening through the external surface of said post at a point above and near the upper one of said retainer rings and spaced substantially from the upper end of the post, said structure having means adjacent said upper retainer ring providing access to the upper end of said passageway, said passageway having a lower end opening through said ridge and communicating directly with said bearing compartment.

References Cited in the file of this patent

UNITED STATES PATENTS

| | | |
|---|---|---|
| 806,435 | Schenck | Dec. 5, 1905 |
| 1,297,592 | Prokopczuk | Mar. 18, 1919 |
| 1,341,630 | Chesnutt | June 1, 1920 |
| 1,636,326 | Roe | July 19, 1927 |
| 1,885,990 | Chesnutt | Nov. 1, 1932 |
| 1,980,123 | Weber | Nov. 6, 1934 |
| 1,982,729 | Eberhard | Dec. 4, 1934 |
| 2,188,648 | Bouvier | Jan. 30, 1940 |
| 2,566,322 | Flowers | Sept. 4, 1951 |
| 2,617,668 | Stewart | Nov. 11, 1952 |
| 2,787,804 | Noelting | Apr. 9, 1957 |
| 2,998,617 | Murphy | Sept. 5, 1961 |

FOREIGN PATENTS

| | | |
|---|---|---|
| 300,874 | Switzerland | Aug. 31, 1954 |
| 624,880 | Great Britain | June 17, 1949 |